Nov. 20, 1928.
C. L. MATTISON
1,692,460
DETACHABLE BEARING HEAD FOR CUTTER SHAFTS AND THE LIKE
Filed March 27, 1924
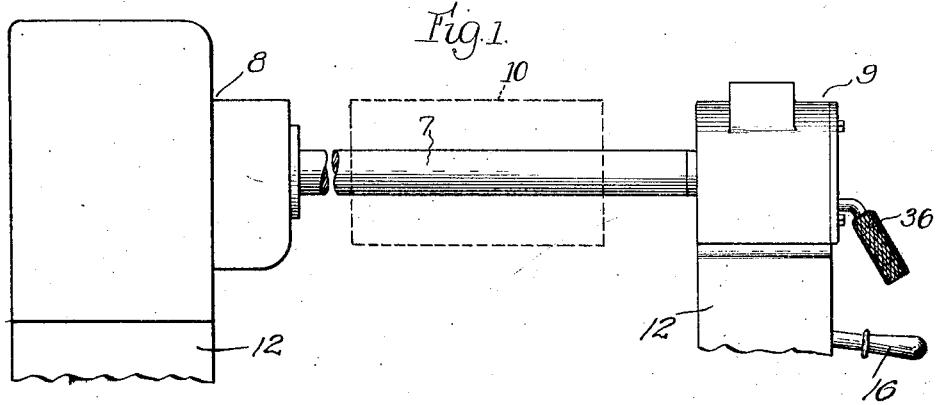
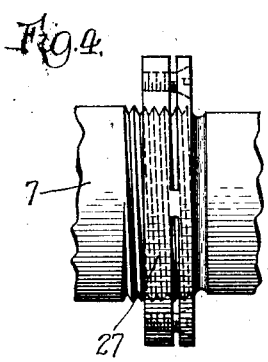
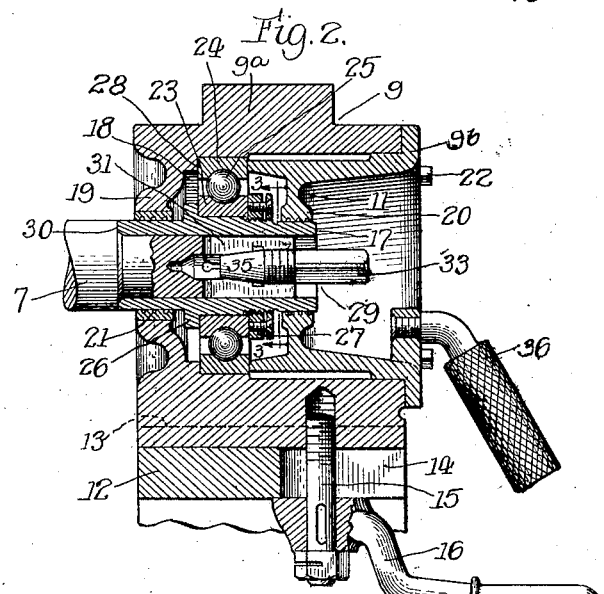
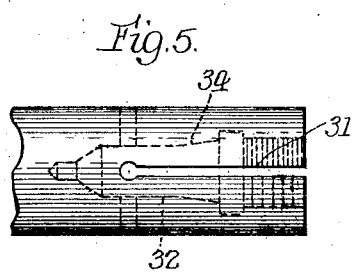
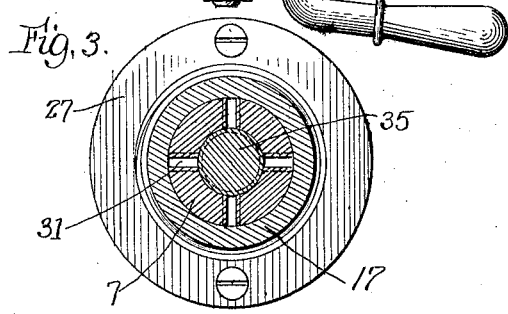
Inventor:
C. L. Mattison,
By Chindahl, Parker & Carlson
Attys.

Patented Nov. 20, 1928.

1,692,460

UNITED STATES PATENT OFFICE.

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS.

DETACHABLE BEARING HEAD FOR CUTTER SHAFTS AND THE LIKE.

Application filed March 27, 1924. Serial No. 702,194.

The invention pertains to bearing heads for the cutter shafts of a moulding machine or the like, and the general object of the invention is to provide a construction permitting of the quick and easy removal of the head when it is desired to change cutters.

Difficulty has been experienced with the bearing head structures heretofore employed because when the shaft has a snug or tight fit with the inner rotating bearing member, it is sometimes very hard to remove the head, and when the fit is made loose enough so as to render the head readily removable, excessive vibration is permitted, resulting in a chattering of the cutter when in engagement with the work. The object of my invention more specifically stated is to overcome these difficulties by the provision of a simple, quickly and easily operated means for releasably holding the end of the cutter shaft snugly in its bearing sleeve.

In the accompanying drawings:

Figure 1 is a fragmentary elevational view of a cutter shaft mounted in oppositely disposed bearing heads, the cutter being shown diagrammatically in broken lines.

Fig. 2 is a fragmentary vertical sectional view through the detachable cutter head.

Fig. 3 is a transverse sectional view taken substantially in the plane of line 3—3 of Fig. 2 but on an enlarged scale.

Fig. 4 is a fragmentary elevational view showing a detail of construction.

Fig. 5 is a similar view of the end of the cutter shaft.

For purposes of illustration I have shown a cutter shaft 7 mounted at one end in a fixed or stationary bearing head 8 and at its other end in a detachable head 9. 10 designates a cutter of suitable type such as is employed in machines for forming picture moulding and the like, it being common practice to change the cutter when changing from one kind of work to another, such changing of cutters being accomplished by removing the head 9 from the shaft 7 and sliding the cutter 10 axially off the end of the shaft past the position normally occupied by the head 9.

Said head 9 is made hollow in construction to receive bearing means designated generally by the numeral 11, in which the free end of the shaft 7 is mounted to turn. The head is adapted to be clamped to the machine frame indicated by the numeral 12. In the present instance I have shown the frame provided with a groove 13 in its upper side to receive the correspondingly shaped base of the head, and the frame has an open-end slot 14 therein to receive a clamping screw 15 having a threaded engagement with the head and having rigid with its lower end a clamping lever 16.

The bearing means 11 comprises an inner bearing member or sleeve 17 which is adapted to be rigidly secured or clamped to the shaft 7 and which is mounted for rotation in the head with a roller bearing 18 interposed between it and the head. As shown, the sleeve 17 is arranged to bear at opposite ends in two inwardly extending annular flanges constituting bearing members 19 and 20, the inner member 19 being herein shown as provided with a bushing 21. The head is preferably made in two sections $9^a$ and $9^b$. The member 19 is formed integral with the section $9^a$ and the member 20 is formed integral with the section $9^b$. The latter is cylindrical in form and arranged to fit within the outer end of the section $9^a$, being rigidly secured thereto as by means of screws 22. The ball bearing 18 is of ordinary construction, comprising inner and outer raceways 23 and 24 with balls 25 interposed therebetween. The inner raceway is rigidly secured to the bearing sleeve 17 between a flange 26 on the sleeve and a lock nut 27 having a screw-threaded engagement with the sleeve. This nut may be of a well known split type shown clearly in Fig. 4.

The outer raceway 24 is held stationary by being secured in the head 9 between the sections $9^a$ and $9^b$ thereof, an annular shoulder 28 being provided in the section $9^a$ against which the raceway is held by the inner end of the section $9^b$ abutting directly thereagainst.

The bearing sleeve 17, as will be understood, is intended to rotate with the shaft 7. At the same time, it is desirable, in order to permit of the easy removal of the head, that the fit between the sleeve and the shaft be such as to permit of easy disengagement. Furthermore, it is essential for the efficient operation of the machine that the fit be sufficiently snug to prevent vibration of the cutter shaft. I accomplish these results by providing a locking means between the shaft and the sleeve. Thus in the present instance I make the end of the shaft of a diameter such that it normally fits loosely within the sleeve 17, and I construct the end of the shaft so as to make it expansible under the action of a suitable expanding means designated by the numeral 29. As herein shown, the said end of the shaft is reduced in diameter forming a shoulder 30 against which the sleeve 17 is arranged to abut.

To make the shaft expansible I form in its extreme end a plurality of longitudinal slots 31 spaced equidistantly about the circumference of the shaft, four being herein shown; and centrally of the shaft I provide a bore 32 of larger diameter at its outer end and internally threaded to receive a radial expander member 33. Toward its inner end the bore 32 tapers to form a conical bearing surface 34 with which the conical inner end 35 of the member 33 is adapted to engage. The outer end of the member 33 is squared, as shown in Fig. 2, for the convenient application of a wrench, and it will be seen that by screwing the member into the shaft, an expansion of the latter into clamping engagement with the bearing sleeve 17 is effected.

It will be apparent that when it is desired to remove the head 9, the lever 16 is operated to release the head from the frame and the expanding member 33 is turned to withdraw its conical end 35 from engagement with the conical bearing surface 34 of the bore 32. Because of the resiliency of the shaft, the outer end thereof immediately resumes its normal size which is such as to permit the easy removal of the bearing sleeve from the shaft with the head, the latter being provided with a suitable handle 36 for this purpose. It will also be noted that the construction provided avoids the necessity of using a clamping nut which must be removed before the head can be detached. Indeed, it has been found that the member 33 need be given about a quarter of a turn only to effect the clamping and unclamping of the head relative to the shaft.

I claim as my invention:

1. In a machine of the character described, the combination of a frame, a cutter shaft, a stationary bearing head for one end of the shaft adapted to support the shaft permanently on said frame for rotational and against longitudinal movement, a cutter carried on said shaft adapted to be slid off the other end thereof for removal from the machine, a bearing head for the said other end of the shaft slidable on said frame longitudinally of the shaft for disengagement from the shaft and removable from the machine to permit removal of the cutter, said head having a bearing sleeve rotatably mounted therein arranged to receive the said other end of the shaft, and means for effecting a connection between the shaft and said sleeve adapted to center the shaft in the sleeve.

2. In a machine of the character described, having a base frame, a cutter arbor supported permanently thereon at one end thereof for rotational movement and a cutter head normally mounted on said arbor and adapted to be removed therefrom by movement off the free end of the arbor, the combination of a removable bearing head for the other end of the arbor, said bearing head being slidable longitudinally of the arbor and out of engagement with the arbor to permit the removal of the cutter and comprising inner and outer bearing members, a ball bearing interposed between said members including an outer raceway and an inner raceway secured respectively to the outer and inner bearing members, and means for releasably locking the shaft to the inner bearing member.

3. In a moulding machine or the like, the combination of a frame, a cutter arbor, bearing means for one end of said arbor adapted to mount said arbor permanently on said frame for rotational movement, a cutter head on said arbor adapted to be slid off the other end of the arbor for removal from the machine, a bearing head for the other end of said arbor normally mounted on said frame and arranged to be disconnected from the frame and arbor for removal therefrom to permit the removal of the cutter, said bearing head including a sleeve adapted to admit the free end of said arbor, and means to effect a quick detachable connection between said arbor and said sleeve.

4. In a moulding machine or the like, in combination with a frame, a cutter shaft permanently and rotatably mounted in said frame, and a cutter carried on said shaft and removable therefrom by an axial movement off one end of the shaft, of a removable bearing head for said end of the shaft comprising inner and outer members and bearing means between said members, means operatively associated with one end of said shaft to detachably secure the shaft to said inner bearing member, and means associated with said frame to be detachably secure said outer bearing member to the frame, said detaching means acting to permit removal of said bearing head as a unit from said frame and shaft so as to permit removal of said cutter head from said shaft by moving said cutter along said shaft past the normal position of said bearing head.

5. In a molding machine or the like, in combination, a base frame, a pair of bearing heads thereon, a spindle rotatably mounted in said bearing heads and carrying a cutting tool which is removable endwise off one end of the spindle, one of said bearing heads being slidably mounted on said base and removable from the spindle in a direction axially off said end of the spindle to permit removal of the cutter, means for securing said removable bearing head to the frame in its normal operating position providing a quickly detachable connection therebetween, and bearing means in said removable head having a quick detachable connection with said end of the shaft.

In testimony whereof, I have hereunto affixed my signature.

CARL LAWRENCE MATTISON.